Patented June 5, 1934

1,961,525

UNITED STATES PATENT OFFICE 1,961,525

ACOUSTICAL PLASTER FOR HIGH HUMIDITY CONDITIONS

James S. Offutt, Chicago, Ill., assignor to United States Gypsum Company, Chicago, Ill., a corporation of Illinois No Drawing. Application September 19, 1930, Serial No. 483,133

10 Claims. (Cl. 106—24)

This invention relates to acoustical materials, and has reference more particularly to a cementitious acoustical or sound absorbing composition especially adapted to be applied to a wall or ceiling of a swimming pool or other rooms having high humidity conditions.

In my co-pending application, Serial No. 439,851 filed March 28, 1930, now matured into Patent No. 1,900,866, March 7, 1933, I have described an acoustical plaster suitable for use in the interior of rooms. The cementing agent used in this plaster consists of calcined gypsum which is known to be somewhat soluble in water and weakens badly under humid conditions. It is desirable that a plaster composition be developed having a high sound absorption and especially adapted for use in swimming pools and other damp places where conditions of high humidity prevail.

An object of this invention, therefore, is to produce a composition of matter suitable for use as an acoustical plaster in damp places; also to improve acoustical plaster compositions in other respects hereinafter specified and claimed.

While it should be understood that my composition can be varied considerably in percentages of different ingredients, the following will give an example of the preferred formula:

|   | Per cent |
|---|---|
| White Portland cement | 22. |
| Graded marble thru 10 mesh retained on 20 mesh screen | 32.5 |
| Pumice thru 10 mesh retained on 20 mesh screen | 37. |
| Hydrated dolomitic lime | 4. |
| Soap bark | .16 |
| Asbestos | 2.5 |
| Calcium stearate | .1 |
| Special wood fiber | .3 |
|   | 100. |

Add water to the above composition to correct plastering consistency, usually about 41–42 parts of water to 100 parts of the dry plaster.

This material is different than ordinary acoustical plaster in that it attains a much greater hardness, is not quite so easy to apply, requires a longer time after application before floating, and does not weaken under conditions of high humidity. It can be washed or scuffed, and hardens gradually. It also must be applied over a carefully prepared base of Portland cement. One specimen of my acoustical plaster showed a sound absorption at pitch $C_4$ of 38%, which is in the range of ordinary acoustical plaster. The proportions of the different ingredients may be varied somewhat as follows with fair results:

|   | Per cent |
|---|---|
| White Portland cement | 20.–25. |
| Graded marble } Pumice } | 65.–80. |
| Hydrated lime | 2.–6. |
| Soap bark | 0.1–0.25 |
| Asbestos (ball milled) | 2.–3. |
| Calcium stearate | 0.–0.3 |
| Wood fiber | 0.2–0.35 |

Instead of white Portland cement, other types of hydraulic cement may be used, the principal desired characteristic being the resistance to moisture after setting. Other granular mineral aggregates, such as quartz rock, etc., may be used instead of the marble if desired, or the marble may be entirely replaced with pumice. Instead of pumice, other light-weight aggregates may be used, such as slag, Haydite, volcanic lava, etc. The soap bark is used as a foaming agent in rather large quantities in order to introduce air into the mixture after the addition of water thereto. This air is introduced into the mixture by the mixing operation and is entrained by the soap bark or other agent. Licorice extract, glue, etc. may be used as a foaming agent instead of soap bark. The calcium stearate is a non-essential water-proofing material used to accentuate the water resisting qualities of the Portland cement binder. Other insoluble metallic stearates may be used if desired.

The special wood fibers used in the composition have a length of $\frac{1}{8}''$ to $\frac{1}{4}''$ and a diameter of .003″ to .01″. Wood fibers of this size have a property of considerably increasing the water carrying capacity of the composition and trowelling consistency, prevent the composition from losing water because of the suction of a dry wall, and give the resulting composition a greater porosity, and, therefore, a greater sound absorption because of the fact that a large amount of water has dried out of the composition, leaving voids in its place. This wood fiber also causes the porous aggregate particles to cling together better, and they are prevented from falling off to an objectionable extent during the subsequent floating operation. Other cellulose fibers, such as paper, cotton, cane, etc., may be substituted for the wood fibers with fair results.

Ordinary hydrated high calcium lime may be substituted instead of the dolomitic lime, although the magnesium content in the dolomitic lime seems to give added plasticity to the mixture, thus making it easier of application. The lime adds some strength to the set plaster, especially when combined with Portland cement, and adds something to its water-proof characteristic. Other plasticizing agents may be used instead of the hydrated lime, such as ball milled diatomaceous earth, colloidal clay, etc.

The asbestos is prepared before mixing with the other ingredients, by placing medium fibered asbestos in a ball mill, and pulverizing same until all of this asbestos will float on water in a decantation test. In this ultra-fine condition, the asbestos considerably increases the plasticity and easy troweling of the resulting plaster when applied to a wall or ceiling. This ingredient may be entirely omitted with a sacrifice of high plasticity. Other plasticizing agents may be used instead of the asbestos, such as ball milled asbestine pulp, mineral wool, etc.

In the swimming pool, or other room of high humidity, the plaster base is first applied of ordinary Portland cement-sand mixture and scratched, to provide a mechanical key. When the base coat is nearly dry, my improved acoustical plaster is applied by means of a trowel. Within a period of approximately two to five hours after application, the surface of the plaster is opened up or "floated" with a blunt instrument by rubbing the instrument over the surface to expose the highly absorbent, porous interior of the plaster for the absorption of sound waves. The composition may be molded in special molds to form tiles or other desired shapes for constructional uses.

I would state in conclusion that while the described examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. A plaster composition that on gaging with water and subsequent setting forms a sound-absorbing connectedly-porous mass having pores extending from the interior to the surface thereof which comprises a cement, an inert aggregate, free lime, a foam-producing substance, and wood fibers of a length and thickness to penetrate the bubbles resulting from the gaging of the said composition with water and which fibers by their subsequent shrinkage on drying effect connections between the voids left by said bubbles.

2. A plaster composition that on gaging with water and subsequent setting forms a sound-absorbing connectedly-porous mass having pores extending from the interior to the surface thereof which comprises Portland cement, an inert aggregate, free added lime, a foam-producing substance, and wood fibers of a length and thickness to penetrate the bubbles resulting from the gaging of the said composition with water and which fibers by their subsequent shrinkage on drying effect connections between the voids left by said bubbles.

3. A plaster composition that on gaging with water and subsequent setting forms a sound-absorbing connectedly-porous mass having pores extending from the interior to the surface thereof which comprises Portland cement, soap bark, asbestos, and wood fibers of a length and thickness to penetrate the bubbles resulting from the gaging of the said composition with water and which fibers by their subsequent shrinkage on drying effect connections between the voids left by said bubbles.

4. A sound-absorbing plaster construction having interconnected pores therein extending to the surface thereof and resulting from the hydraulic setting of a composition as defined in claim 1.

5. A sound-absorbing plaster construction having interconnected pores therein extending to the surface thereof and resulting from the hydraulic setting of a composition as defined in claim 2.

6. A sound-absorbing plaster construction having interconnected pores therein extending to the surface thereof and resulting from the hydraulic setting of a composition as defined in claim 3.

7. A plaster composition that on gaging with water and subsequent setting forms a sound-absorbing connectedly-porous mass having pores extending from the interior to the surface thereof which comprises Portland cement, pumice, hydrated lime, a foam-producing agent selected from the group consisting of soap bark, licorice extract and glue, and wood fibers, the latter being of a length and thickness so as to penetrate the bubbles that result on gaging the composition with water and which fibers on the subsequent setting and drying of the composition shrink and thereby produce interconnecting passages between the voids left by said bubbles.

8. A plaster composition that on gaging with water and subsequent setting forms a sound-absorbing connectedly-porous mass having pores extending from the interior to the surface thereof which comprises Portland cement, marble and pumice graded so as to pass a 10-mesh screen but to be retained on a 20-mesh screen, hydrated lime, soap bark, asbestos, a water-insoluble metallic soap, and wood fibers, the latter being of a length and thickness so as to penetrate the bubbles that result on gaging the composition with water and which fibers on the subsequent setting and drying of the composition shrink and thereby produce interconnecting passages between the voids left by said bubbles.

9. A sound-absorbing plaster construction having interconnected pores therein extending to the surface thereof and resulting from the hydraulic setting of a composition as defined in claim 7.

10. A sound-absorbing plaster construction having interconnected pores therein extending to the surface thereof and resulting from the hydraulic setting of a composition as defined in claim 8.

JAMES S. OFFUTT.